United States Patent [19]

Clavier

[11] Patent Number: 4,978,697
[45] Date of Patent: Dec. 18, 1990

[54] PROCESS FOR THE PRODUCTION OF THERMOSETTING RESINS

[76] Inventor: Philippe Clavier, 27 Avenue de St-Germain, 78160 Marly Le Roi, France

[21] Appl. No.: 288,819

[22] Filed: Dec. 23, 1988

[30] Foreign Application Priority Data

Dec. 23, 1987 [FR] France .................. 87 18035
Apr. 15, 1988 [FR] France .................. 88 05035

[51] Int. Cl.$^5$ .................. C08L 3/00; C08L 3/02; C08L 61/14; C08G 8/10
[52] U.S. Cl. .................. 524/27; 524/56; 524/58; 527/300; 527/303; 527/309
[58] Field of Search .................. 527/300, 303, 309; 524/27, 56, 58

[56] References Cited

U.S. PATENT DOCUMENTS

| | | | |
|---|---|---|---|
| 4,048,16 | 9/1977 | Gibbons et al. | 527/303 |
| 1,886,353 | 11/1932 | Novotny et al. | 524/47 |
| 1,959,433 | 5/1934 | Loetscher | 524/47 |
| 4,524,164 | 6/1985 | Viswanathan et al. | 524/14 |

FOREIGN PATENT DOCUMENTS 0007686 2/1980 European Pat. Off. .

*Primary Examiner*—Nathan M. Nutter
*Attorney, Agent, or Firm*—Young & Thompson

[57] ABSTRACT

A process for manufacturing thermosetting resins comprises reacting a first compound bearing at least one aldehyde function and a second organic compound bearing at least one hydrogen function. The first chemical is an agricultural by-product containing at least one sugar which can be transformed by hydrolysis into a sugar bearing at least one aldehyde function. Such resins are intended in particular for the manufacture of plywood and particle boards.

6 Claims, No Drawings

PROCESS FOR THE PRODUCTION OF THERMOSETTING RESINS

The present invention concerns a process for manufacturing thermosetting resins by reacting a first chemical compound having an aldehyde function with a second organic chemical compound having at least one hydrogen function.

The invention includes, also, the thermosetting resins obtained namely by using the aforementioned process.

The thermosetting resins of the aforementioned type that are mostly in use today are the urea-formaldehyde and the phenol-formaldehyde ones.

Such resins are obtained by reacting a chemical compound having at least one aldehyde function (formaldehyde) with a chemical compound having at least one hydrogen function (urea or phenol).

Such resins are used commonly in the manufacture of plywood and particle boards made with wood fibers or sawdust mixed with a resin of the aforementioned type.

The urea-formaldehyde resin does not withstand erosion by water. It, for that reason, cannot be used within materials that should be resistant to water. The phenol-formaldehyde resin withstands water, but is more expensive than the urea based resin.

It has been found, recently, that formaldehyde vapors are carcinogenic, on the other hand, resins made from formaldehyde are never polymerized completely, so that they always give off formaldehyde vapors, such resins ipso facto constituting a cancer threat.

Accordingly, resins that can replace the urea and phenol-formaldehyde aforementioned resins and avoid their noxiousness are desired. The presently known resins, however, which would be adequate, are much more expensive that the formaldehyde ones.

The aim of the present invention is, thus, to propose a process for manufacturing resins which can replace the known formaldehyde resins and show properties at least as good as formaldehyde resins while also being economically advantageous.

The process according to the invention is thus related to the manufacture of thermosetting resins by reacting a first compound having at least one aldehyde function with a second organic compound having at least one hydrogen function.

In accordance with the invention the process is characterized by using for the first compound an agricultural by-product that contains at least one sugar which can be hydrolyzed under such conditions that the hydrolysis generates a sugar having an aldehyde function.

The inventor has, indeed, found that compounds do exist within agricultural waste products which contain at least one sugar of the aforementioned type.

There can be mentioned, for instance, milk-whey, and, in particular, the whey product in manufacturing cheese.

Such whey contains, depending on its source, from 5 to 13% by weight of a solid content consisting essentially of lactose, proteins and mineral salts.

Such whey, today, has little value, even for instance, when it is sold to hog farmers.

Such whey, in any case, is generated in too large a quantity for the demand. Also, it cannot be disposed of readily, as it is considered to be a pollutant because it captures the oxygen dissolved in water.

Thanks to the invention, such whey finds a worthwhile added value as it can be used to manufacture resins that can compare favorably with the known urea-formaldehyde and phenol-formaldehyde resins.

The inventor, indeed, has found that the lactose contained in such whey could be transformed through hydrolysis into glucose and galactose sugars which possess an aldehyde function and, thus, can react with an organic compound having a hydrogen function, such as urea or phenol, to create a harmless thermosetting resin. The developed formulae for galactose and glucose are:

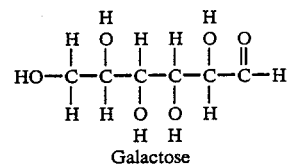
Galactose

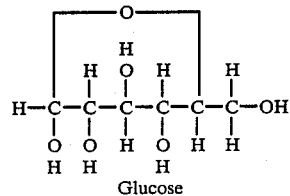
Glucose

One should note that glucose exists as a mixture of three varieties, two of which are very close to the above formula and do not have an aldehyde function, while the third one is very close to galactose and has an aldehyde function. As the equilibrium between such varieties contains, in general, proportionately very little of the variety close to galactose, it can be ignored in the development that follows.

Whey can be hydrolyzed directly as is. It is, however, preferable to extract by ultrafiltration beforehand the proteins it contains, as the extracted proteins possess by themselves a worthwhile added economic value.

The hydrolysis of the whey, or of the remaining product after the proteins have been removed, does not provide a sugar having an aldehyde function if it is done by using a strong mineral acid (hydrochloric or sulfuric acid) at temperatures between 100° and 125° C. On the contrary, the desired result is obtained by reacting whey with lactase under neutral conditions.

The liquid containing the lactose, after it has been hydrolyzed, can be reacted to form a resin directly with the chemical compound bearing at least one hydrogen function.

During this reaction, the temperature is kept under 100° C. to avoid spurious polymerization.

So a to polymerize it partially, the liquid resin is, then, heated to a temperature in excess of 102° C., under a sufficient pressure to avoid vaporization of the water included in it. The polymerization is stopped suddenly by quenching.

The process according to the invention can also utilize starch as starting material, in particular corn starch, which is produced in too large quantities and, thus, constitutes an agricultural waste.

The hydrolysis of starch provides altrose, fructose, galactose, glucose, gulose, idose, mannose, sorbose and talose. Among these sugars: alose, altrose, gulose, idose, mannose, sorbose and talose have, like galactose, an aldehyde function, which can react with a chemical having a hydrogen function to form a resin endowed with excellent properties.

Other peculiarities and advantages of the invention will be apparent from the following description.

There will now be described as one example to which the invention is in no way limited, a process according to the invention starting from whey extracted from cow's milk.

The whey has the following weight composition:

| Proteins: | 9.88% |
|---|---|
| Fats: | 3.44% |
| Lactose: | 59.38% |
| Ashes: | 6.12% |
| Lactic acid: | 15.49% |
| Calcium: | 2.27% |
| Sodium: | 0.44% |
| Chlorides: | 1.28% |
| Phosphorus: | 1.20% |

Such whey has a pH which may vary from 5.2 to 5.8. It depends on the type of cheese (soft, hard or lean) of which the whey is a byproduct.

Such whey can be used in the process according to the invention.

It is, however, preferable to separate from it the proteins existing in the whey. This is done by ultrafiltration. There is thus obtained a watery liquid. This liquid contains a solid content that has approximately the following weight composition:

| Lactose: | 80% |
|---|---|
| Ashes: | <16% |
| Fats: | <0.5% |
| Proteins: | 2 to 4% |
| Mineral salts: | <4% |

The whey or the aforementioned liquid, after being concentrated by evaporation, is hydrolyzed to obtain a mixture of galactose and glucose.

We provide now a numerical example illustrating such hydrolysis.

The whey, or the ultrafiltrated whey, or lactose, concentrated to a 30 to 50% solid content, is mixed in a vat with lactase in proportions that may vary from 0.06% to 6% in volume of lactase per volume of whey, ultrafiltrated whey or lactose.

Such lactase may be, for example, the neutral lactase sold by Pfizer as a liquid containing 2750 ONPG units per milliliter. The activity of this lactase is optimum between 31° C. and 40° C. provided the pH remains between 6.2 and 7.

When using 0.6% by volume of lactase, the hydrolysis is practically complete after 6 to 7 hours.

Many other sources of lactase exist whose strength is optimum under different acid or basic pH conditions.

Because lactase is expensive, it may be recycled by ultrafiltration of the products obtained. The lactases, having molar weights above 10,000, separate easily by ultrafiltration from the glucose and galactose which have molar weights of 180.

There may also be used the so called immobilized lactase columns such as the ones available from the Corning Corporation. In this case the liquid that is being hydrolyzed flows along a coating made of lactase. The lactase is not entrained by the liquid. This is a continuous operation. The exit liquid is 90% hydrolyzed.

The next step in the process according to the invention is the condensation of the resin.

The above mentioned liquid containing galactose and glucose is placed in a reactor. Because the hydrolysis is done under acidic conditions, the pH is less then 2. The pH is adjusted to a value close to 3.5 by adding a base that reacts with the mineral acid to form a mineral salt. The presence of ionized mineral salts contained in the liquid is useful because they catalyze the reaction between the aldehyde functions of the sugars and the hydrogen functions of the compound having such functions.

It has been found that the presence of glucose, proteins and mineral salts different from the ones acting as catalysts has no influence on the properties of the resin end product.

The organic compounds having useful hydrogen functions can be chosen from a very large set of possibilities. Urea and phenol can of course be mentioned. But any chemical bearing an H function like phenol or an H function attached to a nitrogen atom can be chosen.

It is advantageous, however, for the molecule of such a compound to be asymetrical. The resins obtained from cyclic compounds resist water, while others, like the resins obtained from urea, do not.

In addition, it is of interest to choose compounds such that their molar mass per H function is as small as possible. Some H bearing compounds also have some methylol functions ($-CH_2OH$). Such methylol functions act during the condensation like the functions of same type of galactose and other aldehyde bearing sugars.

The molar mass ratio per H function is as follows:

| For urea: | 15 |
|---|---|
| For phenol: | 18.8 |
| For phtalic anhydride: | 54.7 |
| For aniline: | 13.3 |
| For toluene: | 18.4 |

Of these compounds, the preferred ones from a commercial point of view are aniline, urea, phenol and toluene. One must take into account however that urea can only be used when the resin does not have to withstand the action of water.

It is of interest to produce a resin made with no more sugar of the galactose type than can be attached through its aldehyde function to the H functions of the selected compound. It is not necessary to be left, when this is done, with an equal number of H functions and methylol functions. While, indeed, polymerization may be obtained by mating an H function with a methylol function, it can also occur by mating two methylol functions. It should also be noted that the methylol functions of still free sugars of the galactose and glucose types will compete in the resin during polymerization with the methylol functions grafted on the selected H-bearing compound.

The ratio of the number of lactose molecules to the number of molecules of the selected compound should preferably be equal to half the number of H functions per molecule of the selected compound.

This ratio is as follows:
3.5 in the case of aniline
2 in the case of urea
2.5 in the case of phenol
2.5 in the case of toluene.

Thus, knowing the weight of galactose or of sugars of the same type included in the liquid, one can compute the weight one should use of the selected compound.

After the mixture is thus determined, it is introduced into a reactor where it is stirred and heated to a temperature which is kept below 100° C. to avoid polymerization.

The reaction is preferably stopped when all the galactose or sugars of the same type has reacted with the H functions-bearing compound.

At the end of the condensation, there is thus obtained a mixture of sugars that have not reacted and of molecules of the H functions-bearing compound to which are attached molecules of galactose (or sugars of same type). The molecular masses of the non-reacted sugars are of necessity smaller than the ones of the H functions-bearing compound after it has been modified through the condensation process.

The known resins are in general sold as liquids containing 65% solids. In the case of the present invention, the water content of the resulting liquid can be adjusted to arrive at the same percentage.

We shall now describe the polymerization of the resin.

The resulting resin, whatever its composition, polymerizes above a temperature of about 102° C. The polymerization reaction is exothermic. The temperature may reach 185° to 190° C. To avoid the evaporation of water, a sufficient pressure is maintained in the reactor, for instance equal to 3 bars. The polymerization is stopped before completion.

It will be noted that the resins based on galactose obtained by the process described in this invention are very much less viscous than resins based on formaldehyde.

The resins based on galactose (or sugars of same type) obtained by following the process described in this invention show shear strength at least equal to resins based on formaldehyde. In addition, with the resins obtained by following the invention, there is no risk of being affected by the emission of noxious vapors as with formaldehyde.

Thus, the resins obtained by following the invention replace advantageously the resins based on formaldehyde in the manufacture of plywood or of particle boards.

During such manufacturing, the resin is mixed with sawdust or wood fibers in the case of particle boards and resin is spread on wood veneers in the case of plywood.

The panels thus prepared are pressed in a heated press during which the resin polymerizes. This polymerization is never pursued to completion. It is stopped when it is thought to be sufficient.

As the resins obtained following the teachings of the invention are less viscous. They can be prepolymerized to reach a given viscosity before selling them to the manufacturers of particle board or of plywood or to other users.

Such prepolymerization can be stopped by quenching.

With prepolymerization resins the duration of the polymerization during the final use of the resin is at most as short as with conventional resins, a fact that is of great interest to the users.

The inventor has also found that resins could be produced that showed a much increased hardening capacity by increasing, in particular by doubling, the quantity used of the H-functions bearing compound above the optimum values defined previously.

The inventor has also found on the other hand that the creation of resins, based on chemicals bearing aldehyde functions found in waste by products of the food industry, was possible under basic as well as acidic conditions. It is thus possible to develop a much broader line of thermosetting resins capable of covering all the present uses of resins based on formaldehyde.

Because the just mentioned improvement of the present invention provides resins showing a thermosetting capacity at least twice that of those obtained according to the aforementioned optimum process, the use of such an improvement shortens by a factor of the order of four the duration of the polymerization, when all other conditions remain unchanged. It is then in general possible not to prepolymerize the resin, thus avoiding a delicate and expensive step.

If, for example, one chooses to use phenol for the H-functions bearing compound and hydrolyzed lactose for the compound having aldehyde functions, according to the optimum conditions, one would use one mole of phenol for three moles of lactose. On the contrary, according to the process consistent with the improvement mentioned above, one should use two moles of phenol for three moles of lactose.

The principal reason for this modification is found within the equilibrium between the different varieties of glucose. Even though the equilibrium contains only traces of so-called straight glucose, it can be displaced by the generation of more traces of this type of glucose, when such traces are eliminated as soon as they are produced by an adequate chemical reaction. In the present case, the traces of straight glucose, which have an aldehyde function, are snatched by the compound having H-functions, so that the glucose acts as if it were galactose.

It should be noted that, to the contrary of the presently commercially available resins based on formaldehyde, the resins covered by the present invention do not need to contain an excess of H functions bearing compounds or of compounds having aldehyde functions that have not reacted with each other during the condensation.

The condensation reaction between sugars having aldehyde functions and the selected compound having hydrogen functions is slightly exothermic and starts as soon as the compounds are mixed together. The reaction, of course, accelerates when the ambient temperature increases. This temperature, however, must remain relatively low to avoid the caramelization of the sugars. A 60° C. temperature is a good choice.

When the condensation reaction is not complete before the resin is stored, the reaction continues during storage at the ambient temperature, so that one can, if one wishes, let the resin mature in this fashion on the shelf before using it.

On the other hand, according to another improvement of the present invention, the resin can be condensed under whatever pH condition has been attained in the liquid to be condensed. The inventor, indeed, has prepared resins under acid conditions as described in the body of the patent, but also under quasi neutral conditions (for example at pH 6.5; 7; 7.5) and under strongly basic conditions (for example at pH: 9; 10; 12). The basic resins have a different appearance from the one of the acid ones. They are more brown than white. They give off a stronger "glue" smell. They remain more homogeneous: the separation into two distinct phases takes a longer time to occur.

Indeed, resins made according to the present invention, when not stirred, separate into two parts: one that seems solid and that seems liquid. As soon as one the resin is stirred, the two parts mix completely together. However, the part that seems solid can be used without using the one that seems liquid. There are thus obtained concentrated resins which are even stronger than the ordinary ones. Nevertheless, if this can be useful in special cases (very small amount of resin to be used, shorter duration for the polymerization), one needs to be able to dispose of the part of the resin which seems liquid because it is too weak to be used by itself.

One may even go further and, by using an evaporator or a centrifuger on the part of the resin that seems solid, obtain a truly solid resin.

The polymerization of basic or neutral resins is performed under the same conditions used for acid resins. It may even become useful, to achieve for instance a better water resistance, to modify the pH of the resin, whether it be basic or acid, before using it. A 6.5 pH seems to favor the resistance to water.

The means by which the pH is modified, be it before the hydrolysis or before the condensation or before the polymerization of the resin, cannot be chosen arbitrarily. In whey or in the ultrafiltrated whey, in particular, small but not negligible quantities of metallic salts are present. The ions of such metals may even play a catalytic role in the condensation of the resin. But these salts may interfere with the adjustment of the pH and act as inhibitors. In order not to have to add too large quantities of acids or bases, which could modify the properties of the resin, the pH is varied by means of acids or bases which do not displace the equilibrium of the salts present in the reacting liquid. One can, in addition or preferably, choose these acids or bases for the beneficial effects they may bring to the properties of the resin. One can, for example, use stearic acid or phosphorated chemicals to increase the water or fire resistance.

Examples:

(1) in the case of phenol acting on lactose, or whey, or ultrafiltrated whey which has been hydrolyzed, the optimum molar ratio, according to the process described in the body of the patent, is achieved by using three moles of lactose for one mole of phenol. Using these proportions, it is expected that the resin would contain free glucose.

Tests have shown that the expected weight of free primary sugars was indeed reached but that it included half of the galactose.

In view of this result, the molar proportion of phenol has been doubled without finding unreacted phenol in the condensed resin. The proportions used, then, were three moles of lactose for two moles of phenol. No free primary sugars could be found.

By measuring the temperature as a function of time during the polymerization of two particle boards which differed only by the resin used, one being the optimum resin according to the body of the patent, the other being the phenol-enhanced, it has found that the polymerization was approximately four times more rapid with the second resin (3.2 times more rapid on average). For equal weights of resin, indeed, the ratio of the number of potential polymerization links for the phenol enhanced resin and the optimum resin according to the body of the patent is 1.85. The speed of the polymerization is proportional to the square of the number of potential polymerization links.

(2) The same tests as explained in example (1) were repeated using urea instead of phenol. While the optimum resin according to the body of the patent used two moles of lactose per mole of urea, the urea enhanced resin used only one mole of lactose per mole of urea.

Since in this case, the ratio between the number of potential polymerization links for the two resins was also equal to 1.85, the shortening of the duration of the polymerization when using phenol as well as urea enhanced resins was verified with accuracy. Using on one side phenolic resins and on the other resins based on urea, the enhanced resins in both cases were favored over the corresponding optimum resins in a quantitatively identical manner.

(3) An ultrafiltrated whey, by-product of the "petit suisses" industry (a type of cream cheese), when concentrated to 48%, has the following composition:

384 g of lactose
20.4 g of proteins
25.3 g of $CaCl_2$
22.0 g of KCl
21.0 g of $FePO_4$
7.3 g of water.

The pH of this ultrafiltrated whey is 3.9 because it also includes 0.383 g of lactic acid.

To bring the pH back to 6.5 before using lactase for the hydrolysis, it was necessary to add 35 g of caustic soda, even though in theory to neutralize the lactic acid would need only 0.1 g of soda. The extra amount of soda corresponded well to the displacement by the soda of the $CaCl_2$ and $PO_4Fe$ salts.

5.12 ml of a lactase sold under the reference number 3 000 1 by NOVO INDUSTRI were added to the reactants.

After a 12 hours hydrolysis of the lactose by the lactase at a temperature of 41° C. and at a constant pH of 6.5, in a reactor equipped with means for stirring, no trace of lactose could be detected.

After adding phenol in the phenol enhanced proportions defined earlier, namely 70.4 of phenol, it was necessary only to adjust the pH to the desired value for condensation.

Using either caustic soda (basic resin) or sulfuric acid (acid resin), the theoritically required proportion of the one or of the other to reach either a pH of 11 or a pH of 3.5 is very small, but is not realistic.

Caustic soda transforms phenol into sodium phenolate, which required 30 g of soda. This transformation to phenolate, is the major difference between the phenolic basic resins discussed earlier and the corresponding acid resins. This transformation does not affect the condensation of the resin nor its polymerization but allows one to obtain different secondary properties such as a better resistance to the action of water. Using, on the contrary, sulfuric acid to produce an acid resin, one had to neutralize the bases displaced by the caustic soda before the hydrolysis, i.e. the iron and calcium hydroxides. This required 27 g of a 98% sulfuric acid solution.

The acid as well as the basic resins yielded identical results when used to manufacture plywood and particle boards.

I claim:

1. A process for the manufacture of a thermosetting resin, comprising hydrolyzing whey at a pH of about 7 and in the presence of lactase to obtain a mixture of glucose and galactose and then reacting said mixture with an organic compound having at least one hydrogen function at a temperature which does not exceed about 100° C., to obtain a thermosetting resin.

2. A process as claimed in claim 1, wherein the mixture resulting from the hydrolysis is used directly to be transformed into a resin by a condensation reaction with said compound having a hydrogen function.

3. A process as claimed in claim 1, wherein said compound having a hydrogen function is selected from the group consisting of aniline, urea, phenol and toluene.

4. A process as claimed in claim 1, wherein the ratio of the number of molecules of lactose to the number of molecules of said compound having a hydrogen function is substantially equal to half the number of hydrogen functions of said compound.

5. A process as claimed in claim 1, wherein the obtained resin is heated to a temperature exceed 102° C. while under a pressure sufficient to avoid the evaporation of water in order partially to prepolymerize the resin.

6. A process as claimed in claim 1, wherein the mixture of galactose and glucose is reacted with a molar quantity of said compound having a hydrogen function which is twice that necessary to condense only the galactose.

* * * * *